United States Patent
Lee et al.

(10) Patent No.: US 10,291,851 B2
(45) Date of Patent: May 14, 2019

(54) OPTICAL IMAGE STABILIZER FOR A CAMERA MODULE AND METHOD OF CALIBRATING GAIN THEREOF

(71) Applicant: SAMSUNG ELECTRO-MECHANICS CO., LTD., Suwon-si (KR)

(72) Inventors: Sung Mok Lee, Suwon-si (KR); Hee Bum Lee, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 48 days.

(21) Appl. No.: 14/989,016

(22) Filed: Jan. 6, 2016

(65) Prior Publication Data
US 2016/0227120 A1 Aug. 4, 2016

(30) Foreign Application Priority Data
Feb. 4, 2015 (KR) .................. 10-2015-0017483

(51) Int. Cl.
*G03B 43/00* (2006.01)
*H04N 17/00* (2006.01)
*H04N 5/232* (2006.01)

(52) U.S. Cl.
CPC ..... *H04N 5/23287* (2013.01); *H04N 5/23258* (2013.01); *H04N 17/002* (2013.01); *G03B 43/00* (2013.01); *G03B 2217/005* (2013.01)

(58) Field of Classification Search
CPC .............. H04N 5/23248–5/23287; G02B 27/64–27/646; G03B 2205/0007–2205/0038
See application file for complete search history.

(56) References Cited

U.S. PATENT DOCUMENTS

| | | | |
|---|---|---|---|
| 6,943,919 B1* | 9/2005 | Barnick | B41J 2/465 347/232 |
| 2004/0201707 A1* | 10/2004 | Noguchi | G02B 15/173 348/208.7 |
| 2006/0188130 A1* | 8/2006 | Park | G06K 9/00248 382/103 |
| 2008/0136924 A1* | 6/2008 | Washisu | G02B 27/646 348/208.2 |
| 2009/0225176 A1* | 9/2009 | Honjo | G02B 27/646 348/208.99 |
| 2010/0014846 A1* | 1/2010 | Nishi | G03B 5/00 396/52 |
| 2014/0320678 A1 | 10/2014 | Lee et al. | |

FOREIGN PATENT DOCUMENTS

| | | |
|---|---|---|
| JP | 2005-173507 A | 6/2005 |
| KR | 10-2013-0059811 A | 6/2013 |
| KR | 10-2014-0104065 A | 8/2014 |

\* cited by examiner

*Primary Examiner* — Michael E Teitelbaum
(74) *Attorney, Agent, or Firm* — NSIP Law

(57) ABSTRACT

An optical image stabilizer for a camera module includes a camera comprising a lens; and an optical image stabilizer processor configured to: generate a movement pattern signal, adjust a position of the lens of the camera according to the movement pattern signal, and calibrate a gain according to the adjusted position of the lens.

16 Claims, 4 Drawing Sheets

OPTICAL IMAGE STABILIZER FOR A CAMERA MODULE AND METHOD OF CALIBRATING GAIN THEREOF

CROSS-REFERENCE TO RELATED APPLICATION

This application claims the benefit under 35 USC 119(a) of Korean Patent Application No. 10-2015-0017483 filed on Feb. 4, 2015, in the Korean Intellectual Property Office, the entire disclosure of which is incorporated herein by reference for all purposes.

BACKGROUND

1. Field

The following description relates to an optical image stabilizer for a camera module and a method of calibrating a gain thereof.

2. Description of Related Art

Generally, an optical image stabilizer (OIS) provided in a camera includes a position sensor for sensing an adjusted position of a lens for the purpose of optical image stabilization. Since deviations in position sensors may exist between products due to manufacturing errors, in a case in which these deviations are not corrected, position sensors may not perform normally.

In order to solve the above-mentioned problem, an output of the position sensor should be calibrated in terms of an error range. In the related art, gain has been calibrated by directly applying vibrations to the camera using a vibration apparatus and using a position value generated by a position sensor sensing a position of a lens adjusted depending on the vibrations.

However, in the method according to the related art described above, an error of the vibrations may occur depending on a scheme of applying the vibrations to the camera, and a gyro sensor sensing the vibrations may also have an error due to deviations between products depending on a manufacturing process, such that accuracy in correcting errors of the position sensor may not be possible.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical image stabilizer able to accurately calculate a gain value, includes a shortened process time, and ensures high performance by generating a movement pattern signal, comparing an output value of a position sensor output by driving an optical image stabilizer (OIS) using the movement pattern signal with a reference value to calculate a gain value, and calibrating gain using the gain value, and a method of calibrating a gain thereof.

In another general aspect, an optical image stabilizer includes a camera comprising a lens; and an optical image stabilizer processor configured to: generate a movement pattern signal, adjust a position of the lens of the camera according to the movement pattern signal, and calibrate a gain according to the adjusted position of the lens.

The OIS processor includes a movement pattern generator generating the movement pattern signal, a lens driver adjusting the position of the lens of the camera depending on the movement pattern signal, a position sensor sensing the position of the lens to generate a lens position value, a comparer calculating a lens movement amount depending on the movement pattern signal based on the lens position value and comparing the lens movement amount with a reference value, and a gain calibrator calibrating a gain of the position sensor depending on a comparison result of the comparer.

In another general aspect, a method of calibrating a gain of an optical image stabilizer includes generating a movement pattern signal; adjusting a position of a lens of a camera according to the movement pattern signal; imaging a test chart to generate an image signal; sensing the position of the lens; and calibrating a gain based on the position of the lens. The calibrating of the gain may include calculating a gain value based on a position value of the lens, and calibrating the gain using the gain value.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
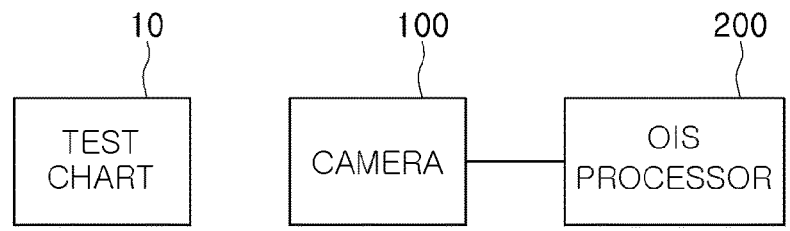
FIG. 1 is a block diagram illustrating an example of an optical image stabilizer (OIS) for a camera module.
Figure 2:
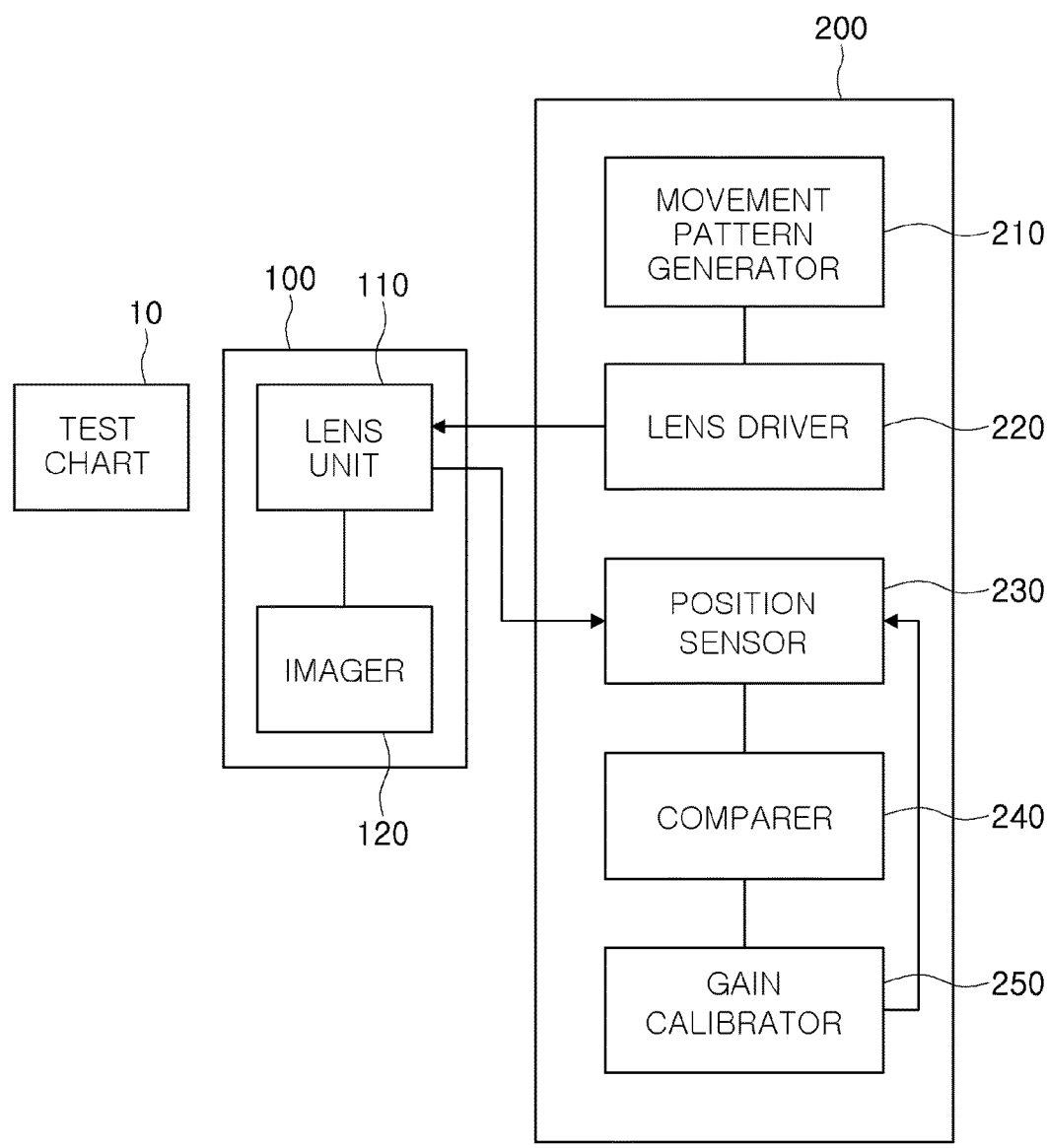
FIG. 2 is a block diagram illustrating an example of the optical image stabilizer of FIG. 1.
Figure 3:
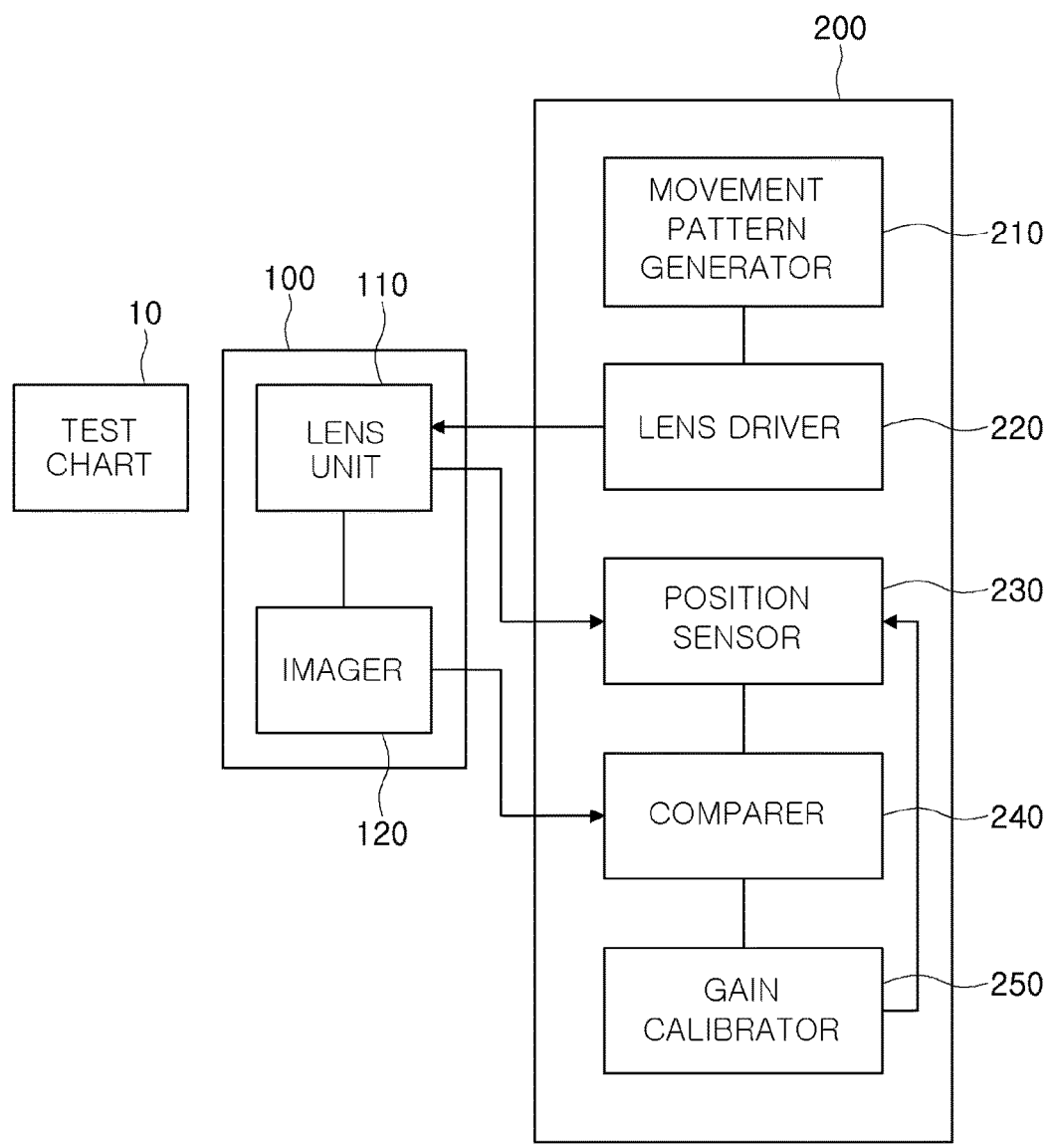
FIG. 3 is a block diagram illustrating another example of the OIS processor of FIG. 1.

Referring to FIGS. 1 through 3, the optical image stabilizer (OIS) includes a camera 100 and an OIS processor 200. The camera 100 is configured to image a test chart 10 to generate an image signal. Here, the camera 100 includes a lens unit 110 and an imager 120. The lens unit 110 is configured to collect light reflected from the test chart 10, disposed forwardly thereof, to form an image in the imager 120. To this end, the lens unit 110 is formed of an optical system including a plurality of lenses. In addition, the lens unit 110 forms an optical group for each function of the lenses. Here, a position of the lens unit 110 may be adjusted by a lens driver 220. Here, the adjusted position of the lens unit 110 is sensed by a position sensor 230.

The imager 120 senses light passing through the lens unit 110 to generate an image signal for an image of the test chart 10. Here, the imager 120 includes an imaging device photosensitizing the image of the test chart 10. The imaging device may be a charge coupled device (CCD) or a complementary metal oxide semiconductor (CMOS). The imager 120 provides the generated image signal to the OIS processor 200.

The OIS processor 200 corrects hand-shake of the camera 100. In detail, the OIS processor 200 senses movement of the camera 100 and adjusts the position of the lens unit 110 in a direction in which the movement is compensated for. The OIS processor 200 calibrates a gain in order to accurately correct the hand-shake. In detail, the OIS processor 200 generates a movement pattern signal, adjusts the position of the lens unit 110 depending on the movement pattern signal, and calibrates the gain based on the adjusted position of the lens unit 110.

In one example, the OIS processor 200 includes a movement pattern generator 210, the lens driver 220, the position sensor 230, a comparer 240, and a gain calibrator 250. The movement pattern generator 210 generates the movement pattern signal and output the movement pattern signal to the lens driver 220. Here, the lens driver 220 is driven according to the movement pattern signal, wherein the pattern signal includes a gyro sensor data pattern signal. In addition, the movement pattern signal includes an x axis movement signal and a y axis movement signal. The lens driver 220 adjusts the position of the lens unit 110 according to the movement pattern signal input from the movement pattern generator 210. The lens driver 220 adjusts the position of the lens unit 110 in a direction in which the movement corresponding to the movement pattern signal.

The position sensor 230 senses the position of the lens unit 110 to generate a lens position value. The position sensor 230 outputs the lens position value to the comparer 240. The position sensor 230 may be a hall sensor configured to sense the position of the lens unit 110.

The comparer 240 calculates a lens movement amount using the lens position value input from the position sensor 230. The comparer 240 compares the calculated lens movement amount with a reference value to calculate a gain value. In one example, the comparer 240 converts the lens movement amount into a pixel movement amount using the image signal from the imager 120, as illustrated in FIG. 3. Here, the comparer 240 converts the lens movement amount into a pixel movement amount for 1 digit, and may also convert the lens movement amount into a pixel movement amount for two or more digits in order to increase gain calibration speed. In addition, the comparer 240 compares the pixel movement amount with a reference pixel value to calculate the gain value. The comparer 240 divides the pixel movement amount by the reference pixel value to calculate the gain value. The gain calibrator 250 calibrates a gain of the position sensor 230 using the gain value calculated by the comparer 240.

Hereinafter, a method of calibrating a gain of an optical image stabilizer will be described with reference to FIGS. 4 through 6.

Figure 4:
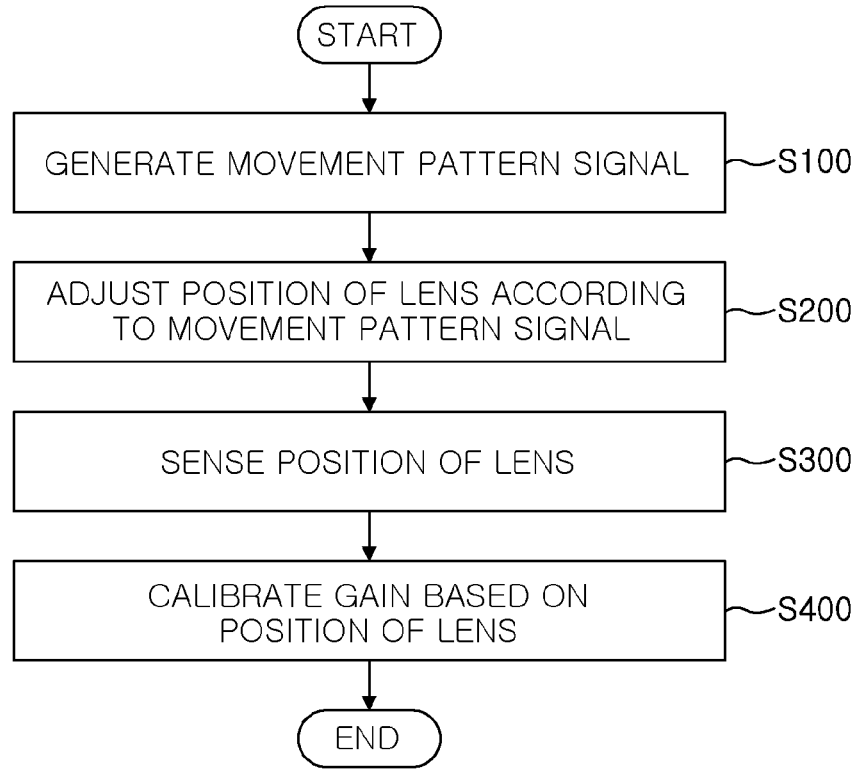
FIG. 4 is a flow chart illustrating an example of a method of calibrating a gain of an optical image stabilizer for a camera module.

Referring to FIG. 4, in the method of calibrating a gain of an optical image stabilizer, the OIS processor 200 generates the movement pattern signal (S100). Here, the movement pattern signal may include the gyro sensor data pattern signal. Next, the camera 100 images the test chart 10 to generate the image signal. The OIS processor 200 adjusts the position of the lens unit 110 in a direction which compensates for handshake movement according to the movement pattern signal (S200). Thereafter, the OIS processor 200 senses the adjusted position of the lens unit 110 (S300). Next, the OIS processor 200 calibrates the gain of the position sensor 230 based on the sensed position of the lens unit 110 (S400). Here, the position sensor 230 may be the hall sensor sensing the position of the lens unit 110. The movement pattern signal includes an x axis movement signal and a y axis movement signal. Here, steps S200 to S400 may be separately performed on the x axis movement signal, and the y axis movement signal, thereby calibrating output gains of the position sensor 230 for an x axis and a y axis.

The calibrating (S400) of the gain will be described below in more detail with reference to FIGS. 5 and 6.

Figure 5:
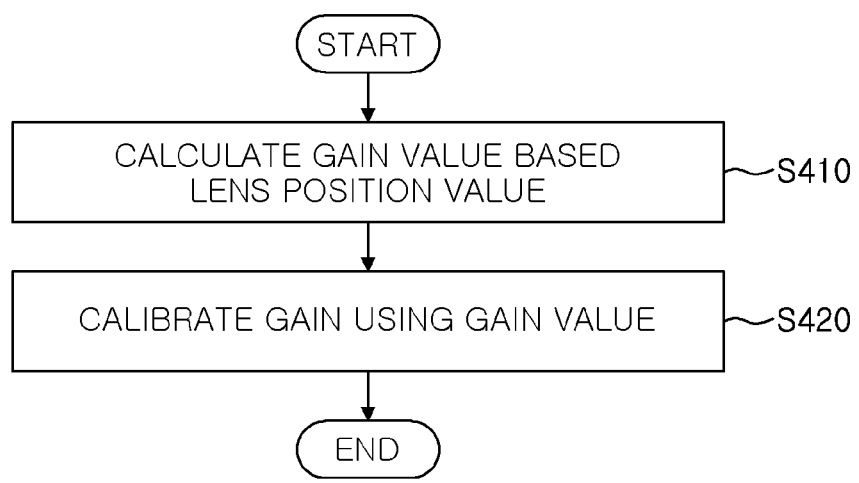
FIG. 5 is a flow chart illustrating an example of calibrating gain of FIG. 4.

Referring to FIG. 5, the calibrating (S400) of the gain includes calculating the gain value based on the lens position value generated by the position sensor 230 (S410) and calibrating the gain of the position sensor 230 using the gain value (S420). Here, the calculating (S410) of the gain value includes calculating, by the OIS processor 200, the lens movement amount based on the position value of the lens (S412), converting, by the OIS processor 200, the lens movement amount into the pixel movement amount in the image signal generated in the camera unit 100 (S414), and comparing, by the OIS processor 200, the pixel movement amount with the reference pixel value to calculate the gain value (S416), as illustrated in FIG. 6. Here, the gain value may be calculated by dividing the pixel movement amount by the reference pixel value.

As set forth above, the movement pattern signal is generated, the output value of the position sensor output by driving an OIS module using the movement pattern signal is compared with the reference value to calculate the gain value, and the gain is calibrated using the gain value, whereby the gain value is accurately calculated, a process time is shortened, and high performance is ensured.

Figure 6:
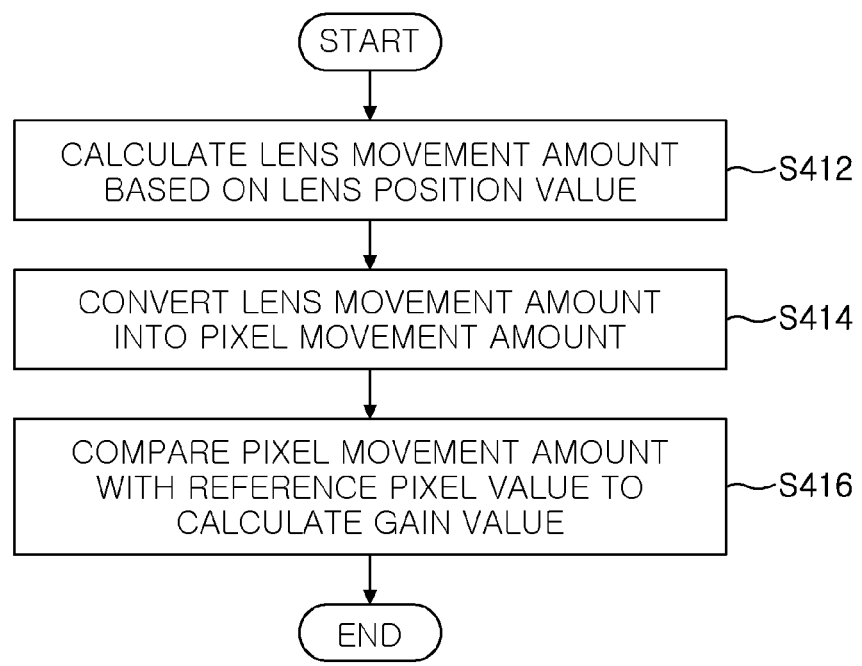
FIG. 6 is a flow chart illustrating an example of calculating a gain value of FIG. 5.

The apparatuses, devices, processors, and other components illustrated in FIGS. 1-3 that perform the operations described herein with respect to FIGS. 4-6 are implemented by hardware components. Examples of hardware components include processors, comparers, calibrators, imagers, controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 4-6. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4-6 that perform the operations described herein with respect to FIGS. 4-6 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical image stabilizer comprising:
a camera comprising a lens; and
an optical image stabilizer processor configured to:
generate a movement pattern signal,
sense the position of the lens of the camera with a position sensor and generate a lens position value,
adjust a position of the lens according to the movement pattern signal,
calculate a pixel movement amount according to the adjusted position of the lens, and
compare the pixel movement amount with a reference pixel value to calculate a gain value for the position sensor.

2. The optical image stabilizer of claim 1, wherein the optical image stabilizer processor is configured to calibrate a gain using the gain value for the position sensor.

3. The optical image stabilizer of claim 2, wherein the camera is configured to image a test chart and generate an image signal according to the test chart, and the optical image stabilizer processor is configured to:
convert the lens movement amount into the pixel movement amount in the image signal.

4. The optical image stabilizer of claim 3, wherein the optical image stabilizer processor is further configured to calculate the gain value by dividing the pixel movement amount by the reference pixel value.

5. The optical image stabilizer of claim 1, wherein the optical image stabilizer processor comprises:
a movement pattern generator configured to generate the movement pattern signal;
a lens driver configured to adjust the position of the lens of the camera according to the movement pattern signal;
the position sensor configured to sense the position of the lens and generate a lens position value;
a comparer configured to calculate a lens movement amount according to the movement pattern signal, based on the lens position value, and compare the lens movement amount with a reference value; and
a gain calibrator configured to calibrate a gain of the position sensor depending on a comparison result of the comparer.

6. The optical image stabilizer of claim 5, wherein the camera is configured to image a test chart and generate an image signal, and
the comparer is configured to convert the lens movement amount into the pixel movement amount in the image signal, and compare the pixel movement amount with a reference pixel value.

7. The optical image stabilizer of claim 6, wherein the comparer is configured to calculate the gain value by dividing the pixel movement amount by the reference pixel value.

8. The optical image stabilizer of claim 7, wherein the gain calibrator is configured to calibrate a gain of the position sensor using the gain value.

9. The optical image stabilizer of claim 5, wherein the position sensor is a hall sensor configured to sense the position of the lens.

10. The optical image stabilizer of claim 1, wherein the movement pattern signal comprises a gyro sensor data pattern signal.

11. A method of calibrating a gain of an optical image stabilizer, the method comprising:
generating a movement pattern signal;
adjusting a position of a lens of a camera according to the movement pattern signal;
generating an image signal;
sensing the position of the lens with a position sensor;
calculate a pixel movement amount in the image signal according to the position of the lens, and
compare the pixel movement amount with a reference pixel value to calculate a gain value for the position sensor.

12. The method of claim 11, further comprising:
calibrating a gain using the gain value for the position sensor.

13. The method of claim 12, wherein the calculating of the gain value comprises:
calculating a lens movement amount based on the position value of the lens;
converting the lens movement amount into the pixel movement amount in the image signal; and
then performing the comparing of the pixel movement amount with the reference pixel value to calculate the gain value for the position sensor.

14. The method of claim 13, wherein the gain value for the position sensor is calculated by dividing the pixel movement amount by the reference pixel value.

15. The method of claim 11, wherein the movement pattern signal comprises a gyro sensor data pattern signal.

16. A non-transitory computer-readable storage medium storing instructions for causing an optical image stabilizer processor to perform the method of claim 11.

* * * * *